Patented Feb. 12, 1946

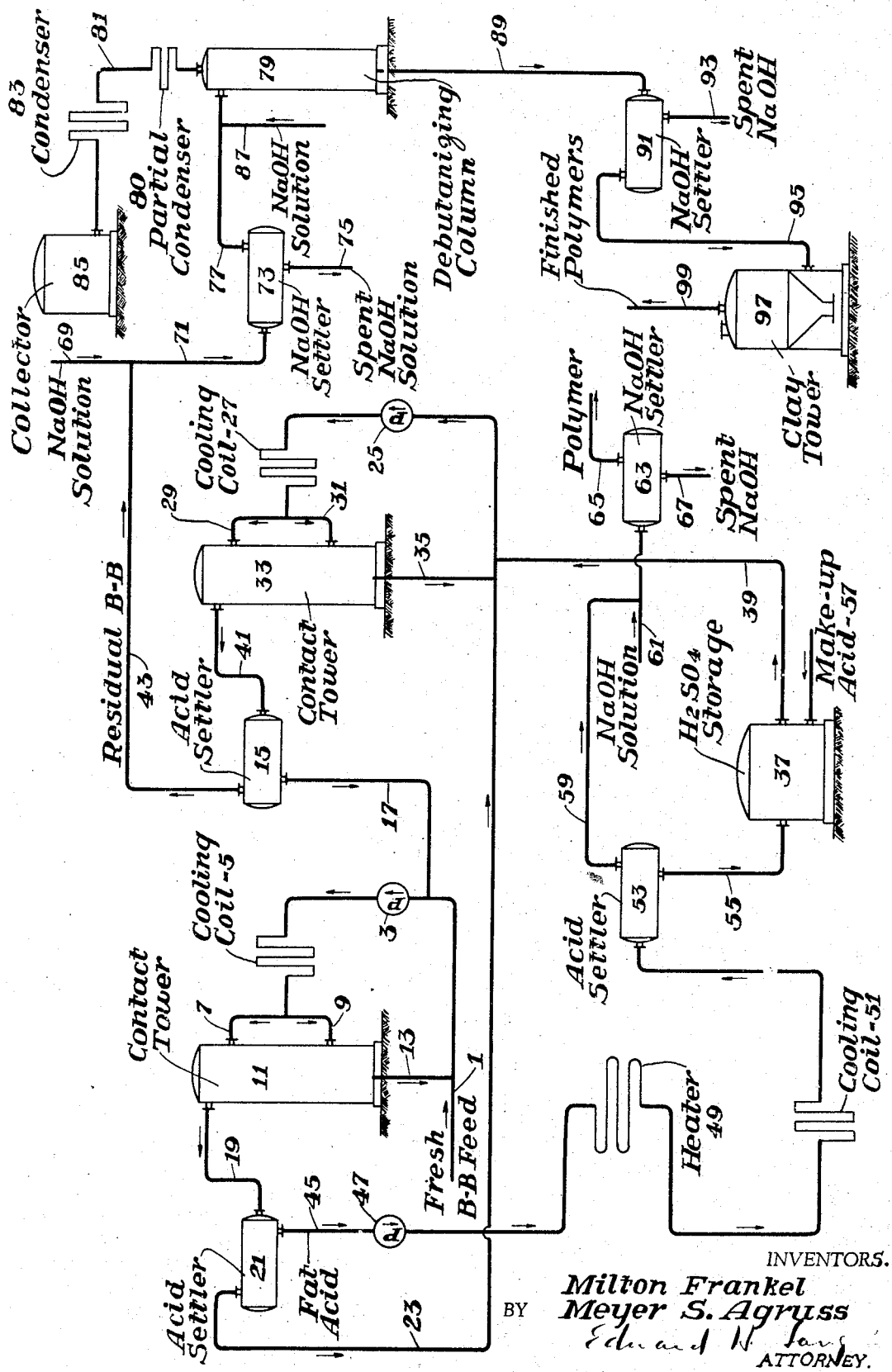

2,394,678

UNITED STATES PATENT OFFICE 2,394,678

PROCESS FOR OBTAINING LOW SULPHUR DIISOBUTYLENE POLYMER

Milton Frankel, Keesler Field, Miss., and Meyer S. Agruss, Chicago, Ill., assignors to The Pure Oil Company, Chicago, Ill., a corporation of Ohio Application September 18, 1943, Serial No. 502,882

4 Claims. (Cl. 260—677)

This invention is directed to the problem of removing sulphur compounds from liquid hydrocarbons and more particularly to the removal of sulphur compounds from polymers formed during polymerization of $C_4$ olefins in the presence of sulphuric acid.

There is in commercial operation a process for preparing di-isobutene by absorption of isobutene in sulphuric acid, following by heating of the fat acid to a temperature at which the absorbed iso-butene polymerizes to di-isobutene and to a lesser extent, to higher boiling polymers. In the so-called cold acid process a $C_4$ fraction composed of n-butane, isobutane, n-butene and isobutene, known as B—B cut and obtained by the stabilization of cracked gasoline, is contacted with sulphuric acid of approximately 65-70% concentration at temperatures of 20-45° C. at a pressure of 100 to 200 pounds per square inch for a period of time of approximately 10 minutes with a hydrocarbon to acid ratio of from 1 of the former to 4 of the latter, to from 4 of the former to 1 of the latter, and preferably at a ratio of about 1 to 1. Under these conditions isobutene is selectively absorbed in the acid, and if conditions are carefully controlled substantially no n-butenes will be absorbed in the acid. The fat acid is then heated to a temperature of approximately 200 to 230° F. under a pressure of 150 pounds per square inch or higher for approximately 20 minutes, in order to convert the absorbed iso-butene to di-isobutene. The resulting polymer can readily be separated from the acid and may be utilized per se as motor fuel or may be hydrogenated to make iso-octane.

In the operation just described the residual B—B cut not absorbed in the acid is recovered for use as blending stock for gasoline, or for use as a base stock in the manufacture of butadiene and for other purposes. The residual B—B is recovered from the process in liquid state and carries in solution a small amount of polymer which may vary from 5 to 10% by volume of the residual B—B. This polymer is separated from the residual B—B by weathering or fractionation. The invention in this application resides in the treatment of the polymers separated from the residual B—B in order to remove sulphur therefrom.

It has been found that the residual B—B from the acid absorption of the iso-butene content thereof contains in solution a small amount of polymer having a rather high sulphur content. The polymer is valuable per se or after hydrogenation as a motor fuel or as a motor fuel blending fraction. However, the high sulphur content is objectionable, among other reasons, because it decreases the lead susceptibility of the polymer and of the gasoline stock with which it is blended. The sulphur compounds in the polymer are difficult to remove, particularly if the polymer has been allowed to remain in storage for some time. Attempts to eliminate sulphur compounds in the polymer by treatment with caustic soda solution resulted only in partial removal thereof.

We have found that if such polymers are contacted with caustic soda solution at elevated temperature and then contacted with siliceous adsorptive material, such as silica gel, fuller's earth or other similar natural or synthetic clays of high porosity, the sulphur compounds in the polymer can be substantially completely eliminated.

In order to make my invention more easily understood, reference is made to the accompanying drawing, which is a diagrammatic flow-sheet of the various steps involved in producing the finished polymer in accordance with my invention.

Numeral 1 indicates a line through which fresh B—B cut is fed to the acid absorption and polymerization plant. As previously stated, the fresh B—B may be the overhead from the stabilization of thermal and/or catalytically cracked gasoline. Fresh B—B is pumped by means of pump 3, through cooler 5, where the temperature is lowered to approximately 20 to 45° C., and then charged through the lines 7 and 9 into contact tower 11. The fresh B—B before being pumped through cooler 5 into the contact tower 11 is mixed with a portion of the liquid withdrawn from the contact tower 11 through line 13, and is further mixed with partially saturated acid withdrawn from acid settler 15 through line 17. The liquid withdrawn through line 13 in addition to acid may contain acid-B—B emulsion and/or unabsorbed B—B.

Acid containing absorbed isobutene and possibly n-butenes, and unabsorbed B—B are withdrawn from the top of tower 11 through line 19 and passed to acid settler 21, where the unabsorbed B—B fraction is separated from the fat acid. The pressure on the system is sufficient to maintain the B—B cut in liquid phase.

The B—B cut partially denuded of its isobutenes is withdrawn from acid settler 21 through line 23 and charged by means of pump 25 through cooling coil 27 and lines 29 and 31 into a second contact tower 33. Before the B—B cut enters the cooling coil 27 it is mixed with emulsion and/or acid from the bottom of contact tower 33 withdrawn through line 35 and with acid withdrawn from storage vessel 37 through line 39. In the second tower 33, a further portion of the isobutene and possibly n-butenes is absorbed in the acid. The semi-fat acid and unabsorbed B—B are withdrawn from tower 33 through line 41 to acid settler 15. In acid settler 15 the residual B—B separates from the fat acid and is withdrawn through line 43.

Fat acid from acid settler 21 is withdrawn through line 45 and pumped by means of pump 47 through heater 49 at a pressure of 150 pounds per square inch or higher. In heater 49 the temperature of the fat acid is raised to approximately 200 to 230° F. at which temperature the absorbed isobutene and any n-butenes present polymerizes to iso-octenes (dimer) and to a lesser extent to isododecenes (trimer). The hot polymer-acid mixture is then cooled in cooling coil 51 to approximately atmospheric temperature and then passed to acid settler 53 where the polymer separates from the acid. The acid is withdrawn through line 55 to storage vessel 37 to be reused in the process. Make-up acid may be added through line 57.

The separated polymer is withdrawn from acid settler 53 through line 59 and mixed with sufficient aqueous caustic soda solution from line 61 to neutralize any remaining acid. The polymer-caustic soda mixture passes to caustic soda settler 63 where the caustic soda solution separates from the polymer. Polymer is withdrawn from the settler through line 65 and passes to storage. The spent caustic is withdrawn from settler 63 through line 67.

Residual B—B withdrawn through line 43 is mixed with sufficient caustic soda solution from line 69 to neutralize the acid content thereof. The residual B—B caustic soda mixture passes through line 71 to caustic soda settler 73 where the aqueous solution separates from the residual B—B. Spent caustic is withdrawn from the settler through line 75 and the neutralized residual B—B is withdrawn through line 77 from which it may pass to a debutanizing column 79 where the $C_4$ hydrocarbons are fractionated from heavier material and taken overhead through partial condenser 80 where the condensed portion is returned to the debutanizer column 79 for reflux and the uncondensed portion passes through line 81 and condenser 83 to collecting vessel 85.

Prior to charging the residual B—B from caustic soda settler 73 to debutanizing column 79 it may be mixed with a small amount, approximately 1 to 20%, of alkali solution such as caustic soda of approximately 10% concentration. Two percent by volume of 10% caustic soda solution has been found to be satisfactory. The caustic soda solution is added through line 87. The caustic soda solution passes downwardly through the debutanizing column 79 with whatever polymer was released during the acid contacting stages and dissolved in the residual B—B and the mixture of the two is withdrawn from the bottom of column through line 89. Temperature and pressure conditions are maintained in column 79 such as to prevent vaporization of the caustic soda solution and polymer, but the temperature at the bottom of column is sufficiently high to eliminate $C_4$ hydrocarbons and to cause hydrolysis of those sulphur compounds which are hydrolyzable. A temperature of 270° F. at the bottom of the column and a pressure of approximately 75 pounds per square inch may be maintained in the debutanizing column. The temperature at the bottom of the column is obtained by means of a suitable reboiler connected thereto.

The products from the bottom of the debutanizing column pass through caustic soda settler 91 where the spent caustic soda separates from the polymer. The spent caustic soda is withdrawn through line 93. The polymer is withdrawn through line 95 and passed through clay tower 97. It is not necessary to cool the polymer prior to passage through the clay tower, but it may be advisable to maintain pressure on the tower sufficient to keep the polymer in liquid state. Finished polymer is withdrawn from the top of the clay tower through line 99. A standby clay tower may be provided which can be put on stream when the clay in the other tower loses its activity. The clay or silica gel may be reactivated by blowing with steam followed by air blowing at elevated temperature or in any other conventional manner.

Instead of treating the residual B—B containing polymer with caustic soda in debutanizing column 79 the residual B—B may be debutanized without addition of alkali and the polymer from the bottom of debutanizing column collected in a storage vessel for further treatment. In such case the polymer may be contacted in a vessel, preferably countercurrently, with the caustic alkali solution at a temperature of 200° F. or higher, under sufficient pressure to prevent evaporation, or in a vessel equipped with a reflux condenser to prevent loss of vapors from the treating vessel. After contacting with the alkali solution for a period of time such that no further reduction in sulphur content is obtained, the polymer is separated from the alkali solution and filtered through a bed of adsorptive material such as activated clay or silica gel contained in a suitable chamber. The time of contact between alkali solution and polymer may vary from approximately 10 minutes to 1 hour or more.

The temperature of contact between the polymer and the clay or silica gel may be atmospheric or at temperatures somewhat higher. Temperatures below 200° F. are preferred in order to avoid risk of further polymerization in the clay tower.

In order to demonstrate the efficacy of the invention in removing sulphur compound from polymer contained in residual B—B from a cold acid plant, a sample of such polymer, representing about 8% by volume of the residual B—B charged to the debutanizing column, was analyzed and determined to contain 0.81% by weight of sulphur. This sample was contacted with 20% by volume of a caustic soda solution containing 10% by weight of sodium hydroxide for 12 hours at 210° F. under atmospheric pressure. The resulting polymer had a sulphur content of 0.38.

Another sample of the same polymer was contacted with 20% of the same caustic soda solution for 5 hours at 280° F. and at 115 pounds per square inch pressure. The sulphur content of the treated polymer was 0.34% by weight.

The polymer which had been treated with caustic soda solution under pressure was then fractionated to obtain a fraction boiling from 150 to 270° F. This particular fraction was chosen because of its possible use in aviation gasoline. The polymer yielded 59.1% by volume of fraction boiling from 150 to 270° F. This fraction was analyzed for various types of sulphur compounds and for iodine number, and gave the following results:

Table

| | |
|---|---|
| Sulphur (total) _____ per cent__ | 0.43 |
| Free sulphur _____ do____ | 0.03 |
| Sulphur as $H_2S$ _____ do____ | None |
| Sulphur as sulphonic acids____ do____ | 0.03 |
| Di-sulphide sulphur _____ do____ | 0.005 |
| Mercaptan sulphur _____ do____ | 0.001 |
| Iodine number _____ | 229 |

The balance of the sulphur content is probably in the form of non-hydrolyzable alkyl sulphates.

The 150°–270° F. cut was filtered through a bed of silica gel at atmospheric temperature and the sulphur on the filtered fraction was determined to be only 0.008. The original polymer, without prior heating with caustic alkali solution, was also filtered through a bed of silica gel. Its sulphur content was reduced to 0.016. After filtering another sample of the original polymer through a bed of fuller's earth of 30 to 60 mesh, the sulphur was reduced to 0.015%.

The A. S. T. M. octane number of the original polymer separated from the residual B—B was 83. The fraction thereof boiling between 150 to 270° F. after treatment to reduce sulphur content to 0.008, was hydrogenated in the presence of a nickel catalyst at 165° F. The iodine number was reduced from 229 to 6 and the octane number of the hydrogenated product was 94. On addition of 2.66 c. c. of tetraethyl lead per gallon of hydrogenated product, the octane number of the product was over 100, thereby indicating a high lead susceptibility for this material.

It will be seen, therefore, that we have succeeded in devising a method for removing harmful sulphur compounds from polymer formed in the acid polymerization of olefinic hydrocarbons.

In the drawing which accompanies this application no attempt has been made to incorporate all the auxiliaries such as valves and pumps which may be necessary for operation of the process. Such auxiliaries as are necessary will be readily apparent to those skilled in the art.

It is claimed:

1. A process for obtaining low sulphur diisobutylene formed by contacting a $C_4$ fraction obtained from the stabilization of cracked gasoline distillate with sulphuric acid having a concentration of approximately 65% under pressure sufficient to maintain the $C_4$ fraction in liquid phase and at temperatures of approximately 20–45° C. and separating from the $C_4$ fraction, constituents boiling above the boiling point of $C_4$ hydrocarbons containing diisobutylene, comprising contacting said higher boiling constituents with boiling caustic alkali solution and then filtering said constituents through siliceous adsorptive material at a temperature below the vaporization temperature of diisobutylene.

2. Process in accordance with claim 1 in which the adsorptive material is silica gel.

3. Process in accordance with claim 1 in which the adsorptive material is fuller's earth.

4. Process in accordance with claim 1 in which the higher boiling constituents are fractionated from the residual $C_4$ hydrocarbons simultaneously with contacting said constituents with boiling caustic alkali solution.

MILTON FRANKEL.
MEYER S. AGRUSS.